No. 688,065. Patented Dec. 3, 1901.
J. A. CRANDALL.
COMBINED CHERRY PITTER AND FORK.
(Application filed July 6, 1901.)
(No Model.)
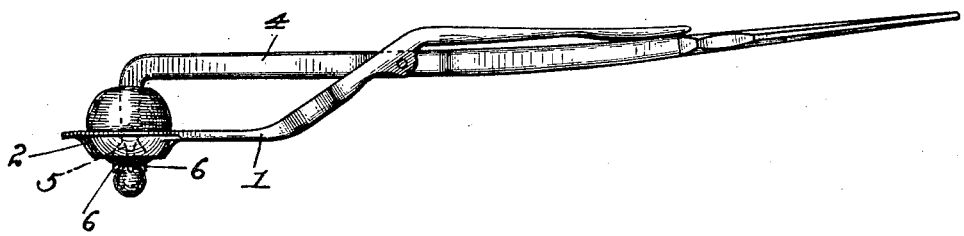
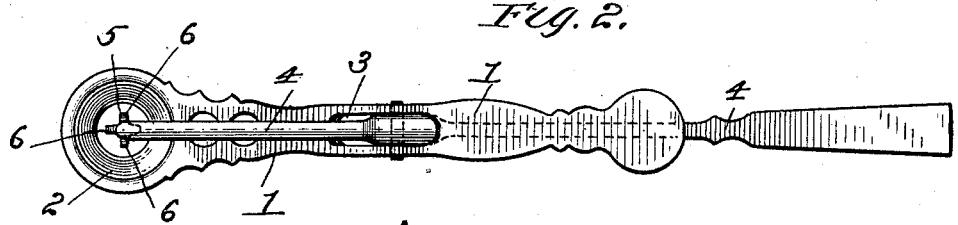
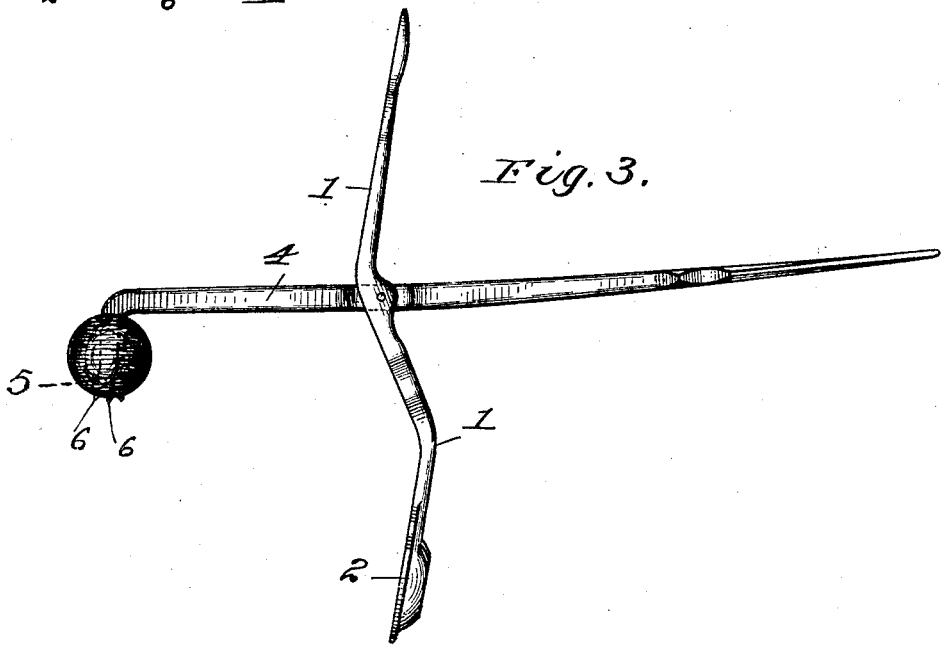
WITNESSES:
L. C. Crawford,
R. H. Bishop.
INVENTOR,
Jesse A. Crandall,
BY Davis & Davis,
ATTORNEYS.

UNITED STATES PATENT OFFICE.

JESSE A. CRANDALL, OF BROOKLYN, NEW YORK, ASSIGNOR TO STEPHEN V. WHITE, OF BROOKLYN, NEW YORK.

COMBINED CHERRY-PITTER AND FORK.

SPECIFICATION forming part of Letters Patent No. 688,065, dated December 3, 1901.

Application filed July 6, 1901. Serial No. 67,303. (No model.)

*To all whom it may concern:*

Be it known that I, JESSE A. CRANDALL, a citizen of the United States, residing in the borough of Brooklyn, county of Kings, city and State of New York, have invented certain new and useful Improvements in a Combined Cherry-Pitter and Fork, of which the following is a specification, reference being had to the accompanying drawings, in which—

Figure 1 is a side elevation of the device; Fig. 2, a plan view thereof; Fig. 3, a side elevation showing the fruit on the fork in position to be carried to the mouth.

The object of this invention is to provide a simple device by means of which cherries may be readily pitted without materially crushing the fruit and to so construct the device that it may be used as a combined pitting device and fork, the fork portion passing through the cherries in the act of pitting and being provided with means for temporarily holding the cherries until they are transferred to the mouth and removed as with an ordinary fork, as more fully hereinafter set forth.

Referring to the various parts by numerals, 1 designates the spoon portion or member, which is formed with the fruit-receiving bowl 2 on its forward end, the bottom of said bowl being perforated at its center. About midway its length this spoon portion is inclined upward and rearward, and in this upward-inclined part is formed a longitudinal slot 3. The substantially straight fork portion or member 4 extends horizontally through this slot and is pivoted therein on a transverse pivot. Near its forward end this fork portion is bent downward substantially at right angles to the main bar, its lower end being adapted to pass down through the perforation in the bowl 2 of the spoon portion. The rear part or handle of the fork is much longer than the corresponding part of the spoon, the two handles lying substantially parallel and the spoon-handle being above and in contact with the fork-handle when the two parts are brought together to force out a cherry-pit. The part of the spoon portion forward of its pivot is heavier than the handle part, and therefore when the handle of the fork is held and the handle of the spoon is released the bowl part will drop away from the forward end of the fork portion, as shown in Fig. 3.

On the forward end of the fork portion is formed a claw-like pit-engaging device 5, which consists of four radial fingers 6, whose lower edges are sharp and are inclined upward and inward, so that when they are brought into engagement with a pit the pit will be centered and held firmly until it is forced through the cherry and down through the perforation in the bowl 2. This pit-engaging device also forms a head which acts as a fruit-holding means to prevent the cherry dropping off the fork when the bowl is dropped away from it, as in Fig. 3.

In operation the handle of the fork portion is grasped in the palm of the hand and the forward end of the spoon is permitted to drop away from the fork. A cherry is placed in the bowl 2, and then the handle of the spoon part is engaged by the fingers or thumb of the hand holding the fork part and the cherry forced up against the pit-engaging end of the fork. Sufficient pressure is exerted to force the claw-like end into the fruit to engage the pit and then to carry the pit down through the fruit and out through the bottom of the bowl. After the pit has dropped from the pit-engaging device the handle of the spoon is released and the bowl part drops away from the fork. The fruit remains held in position on the fork by the headed pit-engaging device and may be readily placed in the mouth. It will be seen that by means of this device cherries may be readily pitted and eaten raw without the unpleasant feature of taking the pits into the mouth and removing them therefrom after the fruit is eaten.

The device by its construction is adapted to remove the pits without materially crushing the fruit.

It will be readily understood that the device may be employed to pit olives and prunes or any other fruit of the like nature.

Having thus described my invention, what I claim as new, and desire to secure by Letters Patent, is—

A combined fruit-pitter and fork consisting of two members crossing each other and pivoted at their intersection and provided with handles which lie one upon the other, one handle being shorter than the other, the forward part of the member having the shorter handle being of greater weight than the rear or handle part and being provided with a fruit-supporting device, and the forward end of the other member being provided with a fruit-pitting stem or fork, this stem or fork being provided with means for temporarily retaining the fruit on it after it has passed through the same.

In testimony whereof I hereunto affix my signature, in the presence of two witnesses, this 5th day of July, 1901.

JESSE A. CRANDALL.

Witnesses:
PERCY G. B. GILKES,
ROBT. H. RANDALL.